Patented May 4, 1954

2,677,688

UNITED STATES PATENT OFFICE 2,677,688

METHOD FOR PRODUCING VINYL PYRIDINES

Lawton Arthur Burrows, Mendenhall, and George Herbert Kalb, Landenberg, Pa., assignors to E. I. du Pont de Nemours & Company, Wilmington, Del., a corporation of Delaware No Drawing. Application May 23, 1951, Serial No. 227,938

3 Claims. (Cl. 260—290)

This invention relates to a new process for the preparation of heterocyclic compounds having unsaturated side chains. More particularly, it relates to a process for the preparation of vinylpyridines.

It is known that ethylpyridines can be dehydrogenated to vinylpyridines by high temperature, vapor phase contact with certain dehydrogenation catalysts. This process, however, is not free from disadvantages. The yields and conversions are sometimes low and, moreover, the activity of the catalyst decreases fairly rapidly after the process has been in operation for some time and the initial yields cannot be maintained for sufficiently long periods of time to make the process economically attractive.

The object of the present invention is to provide a catalytic process for obtaining vinylpyridines in satisfactory and constant yields. Additional objects will be noted from the following description.

The present invention is a process of preparing pyridine compounds having unsaturated side chains which comprises heating in the vapor phase and in the temperature range of 450 to 800° C. a mixture of oxygen and a heterocyclic compound containing a pyridine nucleus having attached to nuclear carbon an alkyl substituent of the formula

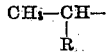

where R is hydrogen or methyl, in intimate contact with iodine as an oxidation (oxidative dehydrogenation) catalyst.

The inventive process is suitably carried out by passing the heterocyclic compounds, containing from 0.1 to 5% by weight of iodine through a tubular reactor heated at 450° to 800° C. together with oxygen or a gas containing oxygen, such as air, in such amount that there is present from 0.1 to 2.0 mole (preferably from 0.3 to 1.5 mole) of oxygen per mole of heterocyclic compound.

The invention is illustrated in greater detail by the following examples, in which parts are by weight unless otherwise noted.

Example I

Over a period of 2 hours a mixture of 1.0 mole of 2-methyl-5-ethylpyrodine containing 2% by weight of iodine with 0.6 mole of oxygen was passed through a quartz tube maintained at 700±25° C. in an electric furnace. The tube was fitted in its center with a thermocouple well. The annular space between the tube and the thermocouple well was packed with 8–14 mesh fused quartz chips, the volume of the reaction zone being about 14 ml. The space velocity in this experiment was about 1285 and the contact time was 0.95 second. The reaction product, which amounted to 123 parts, was collected in an ice-cooled trap. Analysis of this product indicated that it contained 50% by weight of 2-methyl-5-vinylpyridine, representing a 50% conversion and an 87.5% crude yield based on the 2-methyl-5-ethylpyridine employed.

Example II

During a period of 42 minutes, a gaseous mixture of 40.2 grams (0.374 mole) of 2-ethylpyridine 0.4 gram of iodine, 4.2 liters of oxygen and 4.2 liters of nitrogen was passed through a quartz tube packed with quartz chips at a temperature of 700° C. The space velocity in this experiment was about 1600 and the contact time was about 0.62 second. The reaction product was collected in an ice-cooled receiver and washed with saturated aqueous potassium iodide solution to remove most of the iodine, and dried over anhydrous sodium sulfate. Analysis of this material indicated that it contained 11.94 grams of unreacted 2-ethylpyridine and 6.46 grams of 2-vinylpyridine, corresponding to a 16.4% conversion and a 22.9% crude yield.

Example III

Over a period of 9.4 hours, 433 grams (3.63 moles) 5-ethyl-2-methylpyridine and 922 grams (51.2 moles) water, vaporized together, were mixed with 231 liters air (1.89 moles oxygen) and 8.7 grams (0.034 mole) iodine in the heated zone of a silica tube maintained at 750° C. by an electric furnace and packed in the heated zone with broken pieces of silica tubing. The contact time of the gas mixture in the heated zone was 0.67 second. The reaction product was cooled and collected in a water-cooled receiver provided with a reflux condenser, Dry-Ice traps, and scrubbers packed with glass wool. The product amounted to 1350 grams, and the vinyl content, according to titration as 2-methyl-5-vinylpyridine, was 46.4%. From this figure, the calculated conversion was 43.5% and the yield of crude 2-methyl-5-vinylpyridine was 85.5%. Distillation for recovery of 2-methyl-5-vinylpyridine and unreacted 5-ethyl-2-methylpyridine gave a 40% conversion and a 65% yield of recovered 2-methyl-5-vinylpyridine.

Example IV

Over a period of 10.5 hours, 1102 grams (9.12 moles) 5-ethyl-2-methylpyridine was mixed with 612 liters air (5.04 moles oxygen) and 255 grams of a 10% aqueous solution of hydrogen iodide (0.2 mole hydrogen iodide and 12.75 moles water) in the heated zone (700° C.) of a silica tube packed with pieces of silica tubing. The contact time of the gas mixture in the heated zone was 1.1 seconds. The reaction product was cooled and collected in a water-cooled receiver provided with reflux condenser, Dry-Ice traps, and scrubbers packed with glass wool. The product amounted to 1243 grams, and the vinyl content, by titration as 2-methyl-5-vinylpyridine, was 45%. The calculated conversion was 42% and the yield of crude 2-methyl-5-vinylpyridine was 83.5%.

*Example V*

Over a period of 3.85 hours, 474 grams (3.92 moles) 5-ethyl-2-methylpyridine was mixed with 254 liters air (2.08 moles oxygen) and 9.9 grams (0.039 mole) iodine in a silica tube packed in the heated zone only with pieces of silica tubing. The temperature was maintained at 700° C. by an electric furnace and the contact time of the gas mixture in the heated zone was 1.32 seconds. The reaction product was cooled and collected in a water-cooled receiver provided with a reflux condenser, Dry-Ice traps, and scrubbers packed with glass wool. The product amounted to 464 grams, and the vinyl content, by titration as 2-methyl-5-vinylpyridine, was 56%. The calculated conversion was 49% and the yield of crude 2-methyl-5-vinylpyridine was 81%. Distillation for the recovery of 2-methyl-5-vinylpyridine and unreacted 5-ethyl-2-methylpyridine showed a conversion of 39% and a 54% yield of recovered 2-methyl-5-vinylpyridine.

*Example VI*

A solution of 90% 5-ethyl-2-methylpyridine and 10% water was vaporized in a vaporizer and fed at a rate of 1 pound of the pyridine per hour through a reaction tube of high chrome iron 1¼ inches in diameter and 2 feet long heated by an electric furnace to a temperature of 750° C. and packed in the heated zone with broken quartz rings. Air containing an amount of iodine to provide 0.01 pound per hour was fed into the reaction tube at a rate of 7.50 cubic feet per hour. The contact time of the gas mixture in the heated zone was 0.5 second. The product gases were condensed and collected in a receiver equipped with a reflux condenser and a vent line to the atmosphere, the vent line being provided with a fog filter to remove entrained material. The crude product was fractionally distilled to recover the 2-methyl-5-vinylpyridine and the unreacted 5-ethyl-2-methylpyridine. The conversion to 2-methyl-5-vinyl-pyridine was 42.9% and the yield, based on the 5-ethyl-2-methylpyridine and 2-methyl-5-vinylpyridine recovered, was 59.0%.

*Example VII*

A solution of 85% 5-ethyl-2-methylpyridine and 15% water was vaporized in a vaporizer, preheated to 530° C. in a preheater consisting of a coil of stainless-steel pipe heated by electric-resistance heating, and fed at a rate of 8 pounds per hour of the pyridine through an empty tube of high-chrome iron 6 inches in diameter and 6 feet long. Air containing an amount of iodine to provide 0.04 pound per hour was preheated electrically in a coil of stainless-steel pipe to 600° C. and was fed into the reaction tube at a rate (measured at 70° F. and 1 atmosphere) of 78 cubic feet per hour. Both preheater coils were wrapped around the reaction tube to provide adiabatic conditions in the reactor. The temperature in the tube was 700° C. and the contact time of the gas mixture in the heated zone was 3.75 seconds. The hot product gases were condensed and collected in a receiver equipped with a reflux condenser and a vent line to the atmosphere, the vent line being provided with a fog filter to remove entrained material. The crude product was fractionally distilled to recover the 2-methyl-5-vinylpyridine and the unreacted 5-ethyl-2-methylpyridine. The conversion to 2-methyl-5-vinylpyridine was 37.2% and the yield, based on the 5-ethyl-2-methylpyridine and 2-methyl-5-vinylpyridine recovered, was 45.4%.

The process of this invention is applicable to any heterocyclic compound containing a pyridine nucleus having thereon at least one, but preferably not more than two, alkyl substituents of two to three carbon atoms, said substituents containing the group

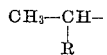

where R is hydrogen or methyl, i. e., being ethyl or isopropyl. The best results are obtained with a nitrogen heterocyclic having one or two six-membered rings, e. g., pyridines, quinolines, or isoquinolines, and in particular with those which, in addition to the intracyclic nitrogen, contain only carbon and hydrogen. Preferably, any other substituent on the pyridine nucleus is an alkyl group of one to three carbon atoms, which, of course, may itself be dehydrogenated. Examples of other unsaturated heterocyclics which can be prepared by the process of this invention are 2-(a-methyl) vinylpyridine from 2-isopropyl pyridine; 2,5-divinylpyridine from 2,5-diethyl pyridine 2-vinylquinoline from 2-ethylquinoline; 2-vinyl-7-methylquinoline from 2-ethyl-7-methylquinoline, etc.

As shown in the examples, either pure oxygen or oxygen mixed with inert diluents such as nitrogen or carbon dioxide can be used in the process of this invention. Thus, the oxygen may be introduced into the reaction vessel in the form of oxygen-nitrogen mixtures, such as air, or of oxygen-carbon dioxide mixtures. The oxygen, or the gas mixture containing it, may be introduced at more than one point along the reaction vessel, if desired, to avoid a large excess of oxygen near the inlet of the reaction vessel. Reduced pressures may be used if desired. As may be seen from the examples, water may be added to the reaction mixture as a diluent to aid, as steam, in the flow of the materials through the reactor and to assist heat transfer.

Instead of using free iodine, it is possible, although there is no special advantage in doing so, to use a compound which liberates iodine in situ at the reaction temperature, such as hydrogen iodide (aqueous or anhydrous) or alkyl iodides. Conversely, the use of iodine produces a certain amount of hydrogen iodide in the reaction mixture.

The heterocyclic compound to be dehydrogenated may be vaporized by preheating before passage through the reaction vessel, and the iodine also may be vaporized by preheating. The heterocyclic compound and the iodine should be vaporized separately because iodine reacts at low temperatures with pyridine compounds to form non-volatile salts and hence would not be carried over into the reaction zone if preheated with the pyridine compound. It is convenient to accomplish the vaporization of the iodine by introducing it into the stream of oxygen and then preheating the mixture before introducing it into the reaction vessel. The latter may contain inert contact masses such as fused quartz chips or glass beads or it may be an empty tubular reactor. Any inert construction material may be used such as glass, quartz, silver- or porcelain-lined metal and the like.

The reaction product is preferably collected by condensing the effluent gas in a suitable cold trap. The unsaturated heterocyclic compound is separated by fractionation or other suitable means from the unreacted starting material and the latter may be recirculated. The iodine present in the reaction product can be separated therefrom by chemical means, such as extraction with aqueous sodium thiosulfate or with aqueous potassium iodide, or by physical means such as distillation or steam distillation.

The process of this invention makes available vinyl substituted compounds having a pyridine nucleus. As is known, these materials are useful in many chemical processes, and specifically as the starting materials for a number of technically valuable polymers and copolymers.

This invention is limited only by the following patent claims.

We claim:

1. The process for the preparation of pyridine compounds having at least one unsaturated side chain containing only carbon and hydrogen atoms and in which two carbon atoms are joined by a double bond, which process comprises heating in intimate contact with iodine in the vapor phase and in the temperature range of 450 to 800° C. a mixture of oxygen and heterocyclic compound containing a pyridine nucleus having attached to nuclear carbon as sole substituents alkyl radicals containing from one to two carbon atoms and also hydrogen atoms but no other atoms, such radicals comprising at least one radical of at least two carbon atoms.

2. The process for the preparation of pyridine compounds having at least one unsaturated side chain containing only carbon and hydrogen atoms and in which two carbon atoms are joined by a double bond, which process comprises heating in intimate contact with 0.1 to 5% by weight of iodine in the vapor phase and in the temperature range of 450 to 800° C. a mixture of oxygen and heterocyclic compound such that there is present from 0.1 to 2.0 mole of oxygen per mole of heterocyclic compound, said heterocyclic compound containing a pyridine nucleus having attached to nuclear carbon as sole substituents alkyl radicals containing from one to two carbon atoms and also hydrogen atoms but no other atoms, such radicals comprising at least one radical of at least two carbon atoms.

3. The process for the preparation of pyridine compounds having at least one unsaturated side chain containing only carbon and hydrogen atoms and in which two carbon atoms are joined by a double bond, which process comprises heating in intimate contact with 0.1 to 5% by weight of iodine in the vapor phase and in the temperature range of 450 to 800° C. a mixture of oxygen and heterocyclic compound such that there is present from 0.3 to 1.5 mole of oxygen per mole of heterocyclic compound, said heterocyclic compound containing a pyridine nucleus having attached to nuclear carbon as sole substituents alkyl radicals containing from one to two carbon atoms and also hydrogen atoms but no other atoms, such radicals comprising at least one radical of at least two carbon atoms.

References Cited in the file of this patent

French et al., Ind. and Eng. Chem. (1948), vol. 40, p. 880.